Figure 1:
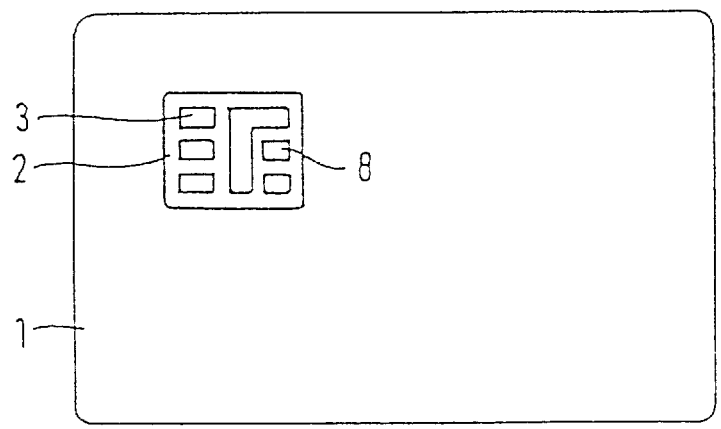

United States Patent [19]

Lamla

[11] Patent Number: 5,917,909
[45] Date of Patent: Jun. 29, 1999

[54] SYSTEM FOR TESTING THE AUTHENTICITY OF A DATA CARRIER

[75] Inventor: Michael Lamla, München, Germany

[73] Assignee: GAO Gesellschaft fur Automation und Organisation mbH, Munich, Germany

[21] Appl. No.: 08/464,771

[22] PCT Filed: Dec. 22, 1993

[86] PCT No.: PCT/EP93/03668

§ 371 Date: Sep. 20, 1995

§ 102(e) Date: Sep. 20, 1995

[87] PCT Pub. No.: WO94/15318

PCT Pub. Date: Jul. 7, 1994

[30] Foreign Application Priority Data

Dec. 23, 1992 [DE] Germany ............... P 42 43 888

[51] Int. Cl.⁶ .................................................. H04L 9/00
[52] U.S. Cl. ................................. 380/4; 380/2; 380/25
[58] Field of Search ................... 380/2, 4, 23, 25; 235/380; 194/211

[56] References Cited

U.S. PATENT DOCUMENTS

| | | | |
|---|---|---|---|
| 4,211,919 | 7/1980 | Ugon | 380/23 |
| 4,231,458 | 11/1980 | Limone et al. | 194/211 |
| 4,467,139 | 8/1984 | Mollier | 380/23 |
| 4,575,621 | 3/1986 | Dreifus | 380/23 |
| 4,593,384 | 6/1986 | Kleijne | 380/23 |
| 4,599,489 | 7/1986 | Cargile | 380/23 |
| 4,811,288 | 3/1989 | Kleijne et al. | 380/23 |
| 4,841,133 | 6/1989 | Gerecki et al. | 235/380 |
| 4,926,480 | 5/1990 | Chaum | 380/23 |
| 4,974,193 | 11/1990 | Beutelspacher et al. | 380/25 |
| 5,123,045 | 6/1992 | Ostrovsky et al. | 380/4 |
| 5,239,664 | 8/1993 | Verrier et al. | 380/4 |

*Primary Examiner*—Salvatore Cangialosi
*Attorney, Agent, or Firm*—Andrus, Sceales, Starke & Sawall

[57] ABSTRACT

A system for testing the authenticity of a data carrier determines the physical property of the data carrier from an irreversibly adjustable electric state of a circuit present separately on the integrated circuit, and uses the electric property of the circuit for establishing a characteristic value for the data carrier.

19 Claims, 3 Drawing Sheets

SYSTEM FOR TESTING THE AUTHENTICITY OF A DATA CARRIER

This invention relates to a system for testing the authenticity of a data carrier.

A system of this type is known e.g. from EP-A1 0 313 967. From this publication it is known to selectively influence the physical fine structure of the IC during chip production and thus incorporate certain structures on or in the integrated circuit that are evaluatable as a physical property characterizing the circuit. In this connection this publication proposes providing the chip with a metallic coating having a random surface structure which is scannable via a resistance measurement at several places, the obtained resistance profile being stored in the form of characteristic data for determining the authenticity of the data carrier. External access to the characteristics storage is no longer possible after burning out of a fuse, e.g. after the initialization phase.

The above system has the disadvantage, however, that the resistance profile is not only elaborate in terms of measurement technology and difficult to determine but is sometimes even unclear, thereby impairing the reliability of the test procedure. Furthermore, the known method cannot ascertain faulty burnings, whereby the fuse was not brought properly from the electroconductive to the nonconductive state, or subsequent manipulation of a properly burned out fuse, both of which would permit unauthorized access to the characteristics storage.

The affect of the invention is to propose a system for testing the authenticity of data carriers which permits more reliable determination of authenticity and better protection of sensitive areas of the data carrier, whereby the physical property determined by the integrated circuit should be detectable with little effort in terms of measurement technology.

This problem is solved according to the invention by the features stated in the claims.

The invention is characterized in that a separate circuit is provided on the integrated circuit of the data carrier, which the semiconductor maker realizes by slightly changing the design of the integrated circuit. The circuit has an irreversibly adjusted electric state characterizing the circuit which is used for establishing a characteristic value for the data carrier and evaluated for determining authenticity.

In a first embodiment the circuit of the integrated circuit includes at least one network consisting of passive components and can additionally contain a control logic for driving switching elements. In a preferred embodiment example this network is executed as a resistor string between an outer free contact connection, which serves as a measuring connection, and the ground connection of the data carrier. For coding this resistor string, which can consist of binomially constructed resistors, fuses are connected in parallel with each series-connected resistor, which are burned out according to the desired coding. Burning out of the fuses is possible only in the test mode, i.e. after the chip has been tested and found good. When the fuses are being burned out an accordingly high current is driven to ground from the free outer measuring connection, the control logic guaranteeing that only those fuses are burned out whose parallel-connected switches are open according to the desired coding. After coding of the resistor string a fuse located between the control logic and the switching elements and unrecognizable without special aids can be burned out to prevent the control logic from being operated in the test mode again. This guarantees that the coding of the network can only be done within the test mode by the semiconductor maker. The coding can for example yield a continuous number, i.e. an individual identification for the integrated circuit, or else be a class feature for the integrated circuit. The expert will of course recognize that the invention is not restricted to the realization of a resistor string, but that other passive components, for example capacitors or inductors, can also be used for the network characterizing the circuit.

Alternatively a test connection (test pad) can be provided instead of an additional control logic for the switching elements for each resistor with a parallel-connected fuse. These pads are available for example after production and during the wafer test. After the chip has been tested and found good, the semiconductor maker drives a high current to the test connections in such a way that the combination of burned out fuses yields the desired coding of the resistor string. The switch-over from the test mode to the user mode can be done by burning out a fuse and/or programming EEPROM or EPROM cells and is irreversible.

In the first embodiment the authenticity testing can take place as follows. The physical property of the network, for example the total resistance value of a binomially coded resistor string, is measured by an external device and then digitized to encode the digital value with the help of a secret code stored in the device. This digital value encoded by the device and connected with the physical property of the network is compared with a characteristic value received from the data carrier. The characteristic value contained in a memory area of the data carrier likewise renders the physical property of the network in an encoded form.

This characteristic value can e.g. be written into a memory in the data carrier during personalization of the data carrier. The writing of the characteristic value and other personal sensitive data takes place during personalization in a protected environment, thereby guaranteeing that only an authorized person can perform the personalization of the data carriers. This can be attained in simple fashion for example if the operator must prove his identity to the device by entering a secret code. The personalization device verifies before operation whether the entered code matches the one stored in the device. To protect the personalization data, such as transaction limit, PIN, etc., from duplication these data can be logically combined with the measured physical property of the network during personalization of the data carrier and the result of logical combination written into the memory of the data carrier by the personalization device.

In a development of the invention a switching element can also be provided which releases the physical property of the network, under the control of a logic unit of the data carrier, for external measurement at a predetermined time and for a predetermined duration. This has the advantage that the authenticity structure of the integrated circuit executed as a separate network is available for external measurement only for a certain time and the authenticity structure is undetectable externally, and thus hidden, outside this time. For example the logic unit of the data carrier releases the physical property of the network for measurement upon reception of a reset signal up to the time of the answer to reset (ATR) transmitted by the cared. Only within this system-specific time window is the physical property of the network detectable. The data carrier can of course test the authenticity of the device connected with the data carrier before the physical property of the network is released, in order to ensure that the physical property of the network is released only to an authentic device, i.e. one authorized for measurement. Furthermore the device can verify with the help of a time-keeping device whether the time during which the physical property of the network is released for measurement by the logic unit of the data carrier is within a system-specific time window. Such a time window must of course always be chosen in accordance with a data exchange protocol stipulated between the communication participants. The particular adaptation of the time window to the application-specific data exchange protocol is a matter of the knowledge and skill of an expert and will not be described more fully here.

In a second embodiment the circuit includes at least one fuse whose electric state after burning out is checked internally in the data carrier and stored in the form of a characteristic value in a memory area of the data carrier. The characteristic value can be transferred for authenticity testing to the apparatus communicating with the data carrier, or be processed internally for blocking the data carrier if necessary. The data are transferred to the apparatus in such a way that no conclusion can be drawn on the actual electric state of the fuse.

The electric property of the fuse is preferably checked at each operation of the data carrier with a signal already necessary for operating the integrated circuit. This makes it possible to ascertain faulty burnings, whereby the fuse was not brought properly from the electroconductive to the nonconductive state, with little technical effort. Furthermore the invention permits ascertainment of later manipulation of a properly burned out fuse, e.g. bridging of the fuse by means of microprobes, the operation of the integrated circuit being blocked internally in case of a faulty burning out or an ascertained manipulation. This makes the data carrier useless for any further application by the defrauder. The invention thus allows effective protection against unauthorized manipulation of an authenticity feature of a data carrier, permitting more reliable determination of the authenticity of the data carrier.

Figure 2:
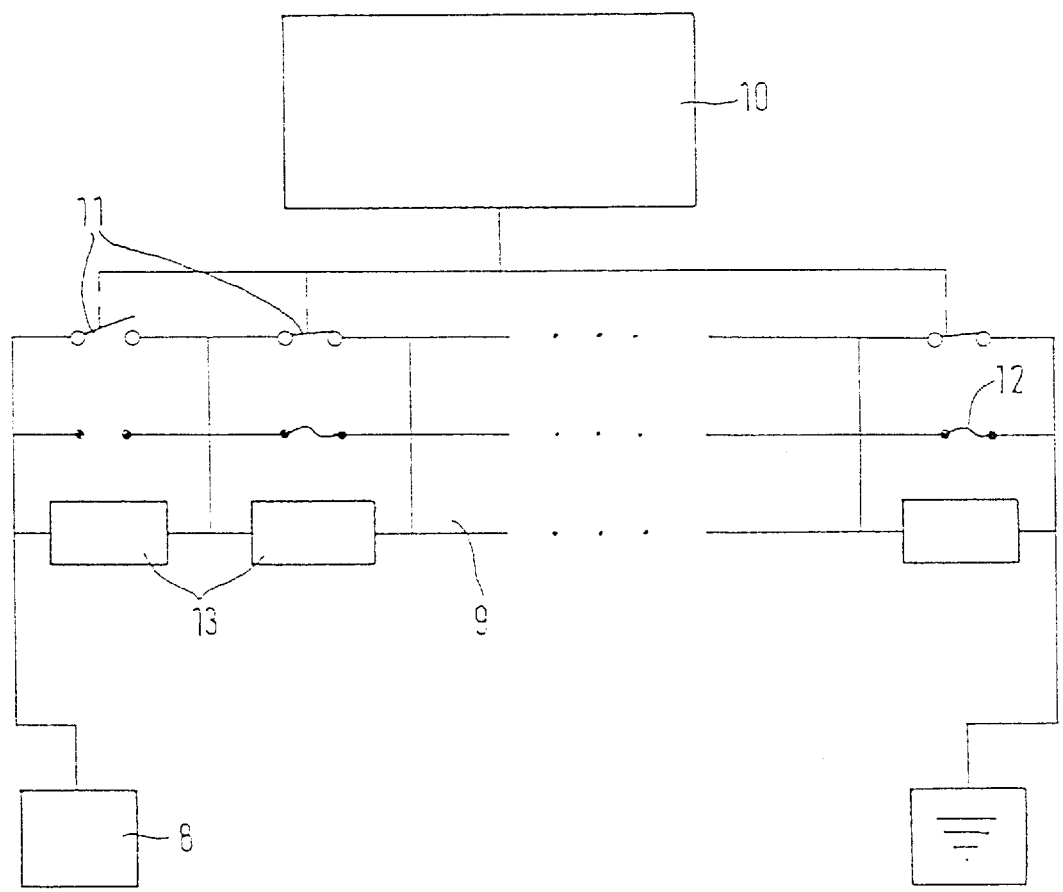
Figure 3:
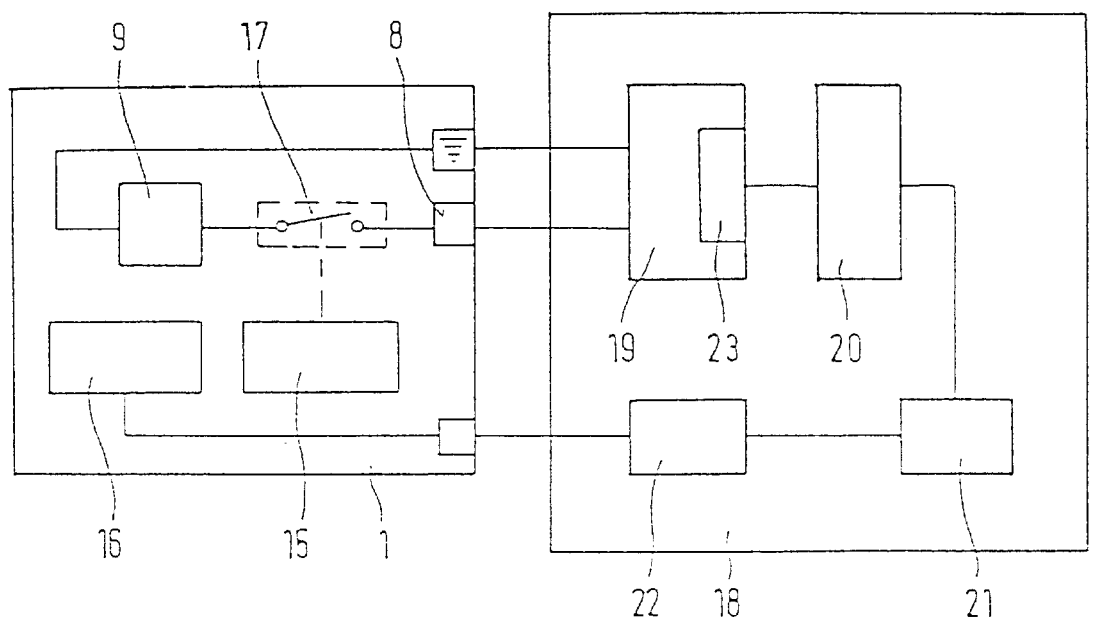
Figure 4:
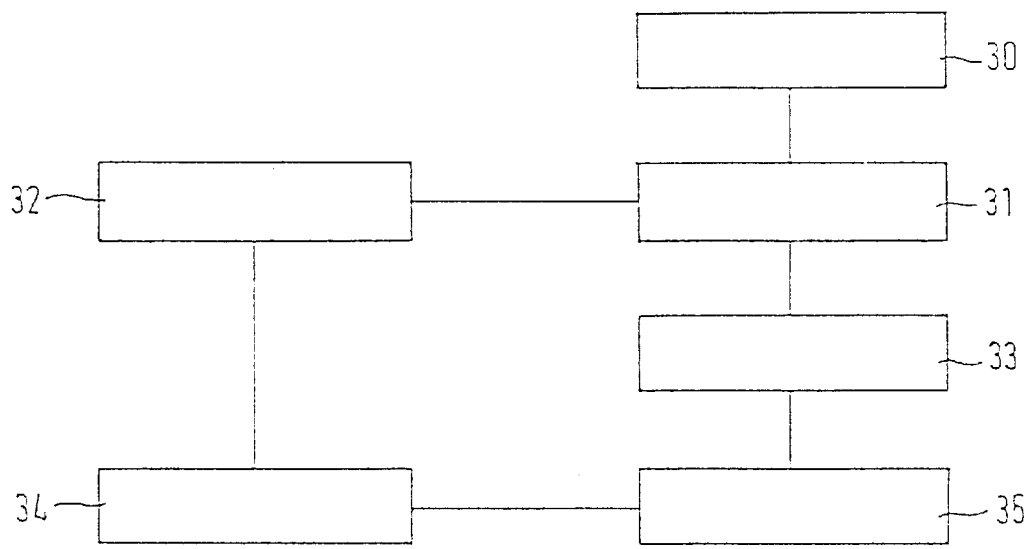
Figure 5:
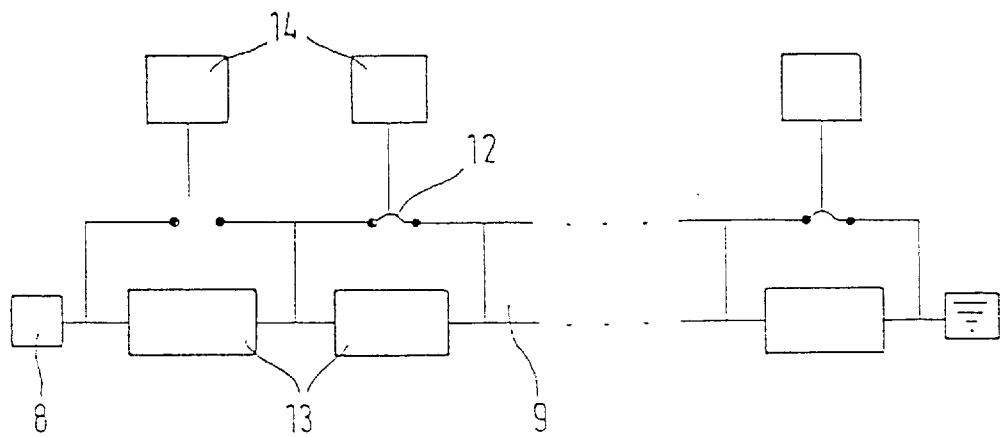
Figure 6:
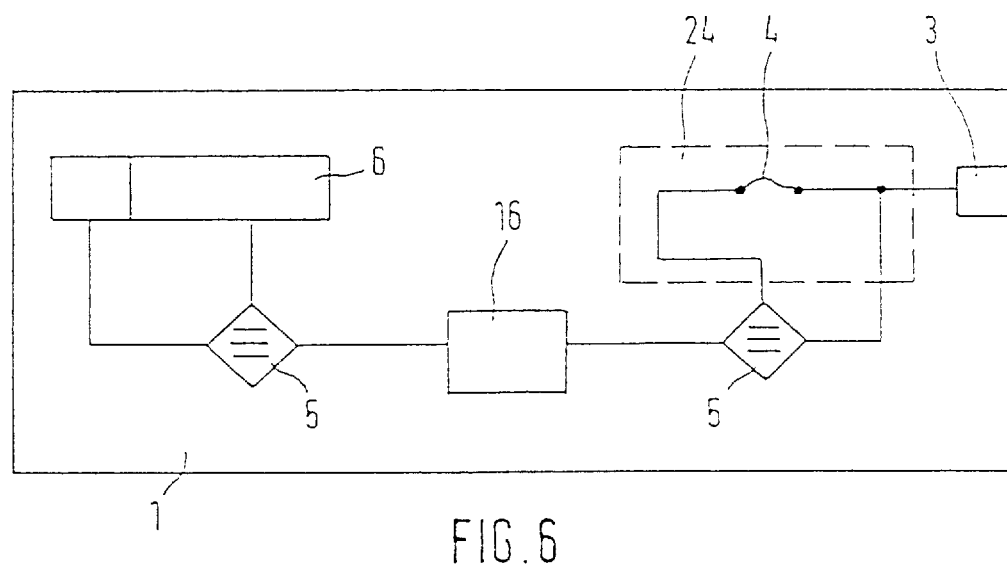

Further advantages and advantageous developments are indicated by the description of the invention with reference to the figures, in which:

FIG. 1 shows a data carrier with an integrated circuit,

FIG. 2 shows the inventive separate circuit in the form of a network with a corresponding control logic, FIG. 3 shows the data carrier in connection with a device for authenticity testing, FIG. 4 shows a flow chart for the authenticity testing of a data carrier, FIG. 5 shows a further embodiment example of a separate network, FIG. 6 shows a data carrier with means for internally testing the electric state of a separate circuit of the integrated circuit.

FIG. 1 shows data carrier 1 as is employed e.g. in cashless money transfer as a debit card or as a memory cared such as a telephone card. The data carrier has an integrated circuit (IC) located on IC module 2 which can be connected electrically via contact surfaces 3 with external peripheral devices. According to a recent standard six contacts are provided, whereby one of the contacts is generally not allocated. This free connection of the IC module, designated as position 8 in the figures, is used as a measuring connection for externally measuring a physical property of the integrated circuit.

FIG. 2 shows inventive network 9 consisting of resistors 13 realized separately on the integrated circuit between connection 8 (measuring connection) and the ground connection of the data carrier. The resistors have resistance values binomially coded from left to right, i.e. beginning with the first resistor e.g. 100 ohms, second resistor 200 ohms, third resistor 400 ohms, etc., and are series-connected. Each resistor of the resistor string has fuse 12 and switching element 11 parallel-connected thereto. The switching elements can be driven e.g. by software by control logic 10 to burn out the fuses according to the desired coding. For buring out the fuse a high current, e.g. 500 mA, is driven to ground from contact 8, whereby only that fuse is burned out, with the help of the switching elements controlled by the control logic, whose particular parallel-connected switch is open. By driving the switches one can obtain the desired coding, i.e. a clearly distinguishable total resistance value, for the resistor string. In the switch position shown in FIG. 1 only the first switch is open and all others are closed, for example, resulting in a total resistance value of 100 ohms for the resistor string present between connection 8 and the ground connection. The binomial coding of the resistor string permits the combination of blown fuses to yield a clear significant total resistance value for the resistor string, which is digitally representable as a continuous number. If all possible variants are combined one thus obtains a continuous number of i=2n, whereby n corresponds to the number of resistors. Another suitable coding can of course also be chosen instead of a binomially coded resistor string. Also, the total resistance of the resistor string does not have to be individual for each integrated circuit. In some cases it may be sufficient if it is class-specific, i.e. a certain production lot of integrated circuits can be coded with one and the same total resistance of a resistor string. After coding of the resistor string, which is done in the test mode, i.e. after the chip has been tested and found good, the connecting line between control logic 10 and switching elements 11 can be interrupted by blowing a fuse (not shown) in order to prevent the control logic from being operated subsequently in the test mode by an unauthorized third party. Thus the control logic is decoupled from the network after the coding operation so that the physical property of the network is "burned in" irreversibly. This offers high protection from manipulation on the part of an unauthorized third party.

In the following the personalization of data carriers with the inventive network will be described. First the physical property of the network is measured and the measured analog value then converted to a digital value. Subsequently the digitized measured value is encrypted with the help of a secret code. Then the encrypted physical property of the network is written into the memory unit of the data carrier as a characteristic value. Other sensitive personalization data, such as PIN, transaction limit, etc., can of course also be logically combined with the measured physical property of the network in the personalization device for writing the result of logical combination into a memory unit of the data carrier. The logical combination chosen can be e.g. an EX-OR operation which is executed by the personalization device.

FIG. 3 shows a simplified block diagram of device 18 for testing the authenticity of data carrier 1 with inventive network 9. The data carrier includes not only network 9 but also logic unit 15, memory unit 16 and optionally provided switching element 17 which connects the network, under the control of the logic unit, for a predetermined time into the measuring path formed between measuring contact 8 and the ground connection by measuring means 19 of the device. For clarity's sake measuring means 19 are shown as a block which already contains a voltage supply e.g. of 10 V and analog-to-digital converter 23 for converting the analog measured value signal to a digital value. The digitized measured physical property of the network is subsequently encoded by encrypting means 20 using a secret code which is stored in the encrypting means so as to be protected from external access. The characteristic value read out of memory unit 16 of the data carrier by reading means 22 of the device is compared with the measuring result encoded by the device with the help of comparator 21. Memory unit 16 of the data carrier can be for example an EEPROM if the physical property of the network is stored in an encoded form. If the physical property of the network measured by the device matches the characteristic value read out of the memory unit of the data carrier, the data carrier is recognized as authentic.

FIG. 4 shows very schematically the sequence of authenticity testing for a data carrier provided with a separate network located on the integrated circuit whose physical property is measurable. When the data carrier is connected with the testing device via the contact elements, the device first tests in method step 30 whether the physical property of the network is present between the ground connection and measuring connection 8, e.g. in the form of the total resistance value of a resistor string. Only if the device ascertains that the measuring path formed with the measuring means is not closed, i.e. high-ohmic, due to open switching element 17, it transmits a reset signal to the data carrier in method step 31. Upon reception of the reset signal the address counter of logic unit 15 is set to a defined initial state and the switching element closed. Method step 32 shows that switching element 17 is closed by the logic unit of the data carrier by software control up to the time of the answer to reset (ATR) of the data carrier, thus releasing the physical property of the network for measurement by the measuring means of the device within this time window. The determination of the physical property of the network, i.e. the total resistance value of the resistor string, and the following encoding using a secret code is shown in method step 33. Method step 34 shows the transmission of the characteristic value contained in the memory unit of the data carrier as the third byte in the ATR which is sent from the data carrier to the device. Method step 35 shows how the characteristic value received in the third byte of the ATR is compared with the measured variable obtained from method step 33. If the characteristic value received from the data carrier matches the measured digitized and subsequently encrypted physical property of the network, the data carrier is recognized as authentic. The result of authenticity testing can also be indicated on a display of the device, if desired.

FIG. 5 shows a further embodiment example of the inventive network present separately on the integrated circuit. In this variant there is test connection 14 for each fuse and each resistor, to which a high current, e.g. 500 mA, is applied to blow the fuse according to the desired coding, so that the combination of blown fuses yields a total resistance value characteristic of the resistor string. As in the first embodiment, fuses 12 are parallel-connected with resistors 13 series-connected between measuring connection 8 and the ground connection. In comparison to the first embodiment one can dispense with control logic 10 and switches 11 in this variant. After the chip has been tested and the network coded accordingly, test connections 14 are switched off after the coding operation. This can be done by simply disconnecting the test connections mechanically. Since the test contacts are already available after production and during the wafer test, the network provided separately on the integrated circuit can be realized in simple fashion, for example in the form of a resistor string.

FIG. 6 shows a greatly schematized view for clarity's sake of data carrier 1 with internal means 5 for checking the electric state of circuit 24 having at least one fuse 4, e.g. for protecting sensitive areas of the data carrier. After the chip has been tested and found good and after e.g. the desired coding of the authenticity feature of the integrated circuit has taken place, fuse 4 is burned out, being thereby brought from the electroconductive to the nonconductive state. Circuit 24 can of course also have further elements for controlling burning out, which are familiar to the expert and omitted here for simplicity's sake. For checking the electric state of fuse 4 an external signal, e.g. the supply voltage or the clock signal of the integrated circuit, is fed in via outer contact surface 3 electrically connected with the input of the fuse, and compared with the signal received at the output of the fuse by means of first comparator 5. The result of comparison of the first comparator is written into memory 16, e.g. RAM, as a characteristic value e.g. after each application of the external signal. The result of comparison located in the RAM can be transferred in the answer to reset signal (ATR) from the data carrier to a card reading device for authenticity testing. The RAM state can be compared with reference information by means of further comparator 5 at each operation of the data carrier. The reference information is e.g. a value representative of the electroconductive state of fuse 4, and is stored in nonvolatile memory unit 6 of the data carrier protected against external access. If there is agreement with the reference information, i.e. if fuse 4 assumes an improper electroconductive state after burning out, second comparator 5 produces a corresponding blocking signal which can be used to block the circuit irreversibly. For this purpose, information characterizing the blockage is written for example into a certain area of nonvolatile memory 6 of the integrated circuit protected from external access. At each initialization of the data carrier this certain memory area is interrogated by the integrated circuit, and upon ascertainment of the blocking information the control unit of the integrated circuit is for example reset to the hold state or to the beginning of the program. In this case an error message is issued which permits no conclusion to be drawn that fuse 4 has the improper, i.e. electroconductive, state. The error message can e.g. be passed along with the data exchange protocol stipulated between the data carrier and a device in a way not recognizable to an outside third party, e.g. in the authenticity signal for a debit card or in the message "Units used up" for a memory card.

I claim:

1. A system for testing the authenticity of a data carrier, comprising:

a data carrier (1) having at least one integrated circuit element, said integrated circuit element having memory units (6, 16), logic units (15), and communication elements (3), said integrated circuit element having a circuit portion (9, 24) which is unitary with said integrated circuit element but separate from said memory units, logic units and communication elements, said circuit portion having means for providing a plurality of electrical states to said circuit portion and for adjusting the electrical state among said plurality of electrical states, said circuit portion having means for establishing a given electrical state of said circuit portion, thereby to establish a characteristic value for the data carrier, one of said circuit portion and said integrated circuit element having means for preventing further adjustment of said circuit portion from said given electrical state;

apparatus (18) having an access via said communication elements (3) to at least partial areas of the memory units (6, 16) for reading and/or writing data; and means (5, 19) for determining the electrical state of said circuit portion, thereby to authenticate the data carrier by the characteristic value established by said circuit portion.

2. The system of claim 1, characterized in that the circuit portion (9) includes at least one network comprising passive components.

3. The system of claim 2 characterized in that said network comprises a binomially coded resistor string and wherein the electrical state of said circuit portion is the total resistance of the resistor string.

4. The system of claim 1 characterized in that said means (19) for determining the electrical state of said circuit portion is part of an apparatus (18) which has encrypting means (20) for encoding the determined electrical state of said circuit portion (9), and wherein said memory unit (16) of the data carrier contains the encoded electrical state of said circuit portion as the characteristic value for the data carrier.

5. The system of claim 4, characterized in that the characteristic value is transferred from the data carrier (1) to the apparatus (18) as the third byte in an answer to reset (ATR) signal.

6. The system of claim 5, characterized in that the apparatus (18) has a comparator (21) for comparing the received characteristic value with the electrical state of the circuit (9) measured and encoded by the apparatus (18), the comparison taking place at each operation of the data carrier(1).

7. The system of claim 1 wherein said data carrier is further defined as allowing the determination of the electrical state of said circuit portion to occur only at a certain time and for a time period of predetermined duration.

8. The system of claim 7 wherein said logic unit (15) of the data carrier (1) controls said time certain and period of predetermined duration as system-specific parameters in accordance with a signal received from said apparatus (18), and wherein said apparatus is further defined as verifying whether said system-specific parameters fulfill predetermined conditions.

9. The system of claim 8 characterized in that said apparatus (18) provides said signal to said data carrier (1) as a reset signal and wherein said logic unit (15) is further defined as releasing the electrical state of said circuit portion (9) for external measurement by means of a switching element (17) of the data carrier from the time of receipt of said reset signal up to the time of an answer to reset (ATR) signal transmitted from said data carrier to said apparatus.

10. The system of claim 1, characterized in that the circuit portion (24) has at least one fuse (4) which is brought by an burning out irreversibly from the electroconductive to the nonconductive state, thereby protecting sensitive areas of the data carrier (1) from external access.

11. The system of claim 10, characterized in that the data carrier (1) has means (5) for checking the electric property of the fuse, whereby an external signal is fed in via a communication element (3) of the integrated circuit element connected with an input of the fuse (4) and this is compared at an output of the fuse (4) with the fed-in signal and the result of comparison is written into a memory unit area (16) of the data carrier as a characteristic value.

12. The system of claim 11 characterized in that said means (5) for checking the electric property of the fuse is further defined as employing an external signal that is essential for operating the integrated circuit element.

13. The system of claim 11 wherein said data carrier provides an answer to reset (ATR) signal containing a characteristic value and wherein said characteristic value for the data carrier is provided to said apparatus to authenticate the data carrier during each operation of the data carrier.

14. The system of claim 11 wherein said integrated circuit element is characterized in that a characteristic value is compared with internally stored reference information in the integrated circuit element of said data carrier (1) and operation of the integrated circuit element is blocked if an improper electrical state of said fuse (4) has been ascertained.

15. The system of claim 14 wherein said data carrier is further defined as transferring an error message to said apparatus (18) upon blocked operation of said integrated circuit element, said error message permitting no conclusion to be drawn of the electrical state of said fuse (4).

16. A data carrier suitable for use with apparatus for testing the authenticity of the data carrier, said data carrier (1) having at least one integrated circuit element, said integrated circuit element having memory units (6, 16), logic units (15), and communication elements (3) for communication with the testing apparatus, said integrated circuit element having a circuit portion (9, 24) which is unitary with said integrated circuit element but separate from said memory units, logic units, and communication elements, said circuit portion having means for providing a plurality of electrical states to said circuit portion and for adjusting the electrical state among said plurality of electrical states, said circuit portion having means for establishing a given electrical state of said circuit portion, thereby to establish a characteristic value for the data carrier for use in authenticating said data carrier, one of said circuit portion and said integrated circuit element having means for preventing further adjustment of said circuit portion from said given electrical state.

17. The data carrier of claim 16, characterized in that the circuit portion (9) includes at least one network comprising passive components.

18. The data carrier of claim 2, characterized in that the circuit system (24) has at least one fuse (4) which is brought by burning out irreversibly from the electroconductive to the nonconductive state, thereby protecting sensitive areas of the data carrier (1) from external access.

19. The data carrier of claim 5, characterized in that the data carrier (1) has means (5) for checking the electric property of the fuse.

* * * * *